United States Patent
Shih

(10) Patent No.: US 9,781,955 B2
(45) Date of Patent: Oct. 10, 2017

(54) CONNECTING STRUCTURE FOR CONNECTING WATERPROOF BREATHABLE AND WARM KEEPING FABRICS

(71) Applicant: Pacific Eagle Enterprise Co., Ltd., Taichung (TW)

(72) Inventor: Arthur Tse-Shao Shih, Taichung (TW)

(73) Assignee: Pacific Eagle Enterprise Co., Ltd., Taichung (TW)

( * ) Notice: Subject to any disclaimer, the term of this patent is extended or adjusted under 35 U.S.C. 154(b) by 102 days.

(21) Appl. No.: 15/005,738

(22) Filed: Jan. 25, 2016

(65) Prior Publication Data

US 2017/0208872 A1    Jul. 27, 2017

(51) Int. Cl.
| | |
|---|---|
| B32B 7/12 | (2006.01) |
| A41D 1/08 | (2006.01) |
| B32B 5/18 | (2006.01) |
| B32B 5/24 | (2006.01) |
| B32B 5/26 | (2006.01) |
| B32B 3/26 | (2006.01) |
| A41D 31/00 | (2006.01) |
| A41D 27/28 | (2006.01) |

(52) U.S. Cl.
CPC .............. *A41D 1/08* (2013.01); *A41D 27/28* (2013.01); *A41D 31/0038* (2013.01); *B32B 3/266* (2013.01); *B32B 5/18* (2013.01); *B32B 5/245* (2013.01); *B32B 5/26* (2013.01); *B32B 7/12* (2013.01); *B32B 2307/724* (2013.01); *B32B 2307/7265* (2013.01); *B32B 2437/00* (2013.01)

(58) Field of Classification Search
CPC ............... Y10T 428/19; Y10T 428/192; Y10T 428/197; A41D 13/012; A41D 27/245; B29C 66/1142
See application file for complete search history.

(56) References Cited

U.S. PATENT DOCUMENTS 8,435,617 B2 *   5/2013   Hannon ............... A41D 27/245
                                                 428/36.1

* cited by examiner

*Primary Examiner* — Alexander Thomas
(74) *Attorney, Agent, or Firm* — Wang Law Firm, Inc.

(57) ABSTRACT

A connecting structure for connecting waterproof breathable and warm keeping fabrics includes: at least two pieces of fabric, a first adhesive layer, and a first waterproof rubberized layer. Each piece of fabric sequentially includes an inner mesh fabric layer, a breathable and waterproof layer, a breathable layer and an outer fabric layer. The breathable layer includes a plurality of air holes to communicate with the breathable and waterproof layer, the first adhesive layer is fixed to a connecting position of each pieces of fabric, and the first waterproof rubberized layer is fixed to the inner mesh fabric layer and coated with a second adhesive layer, so that the second adhesive layer and the first adhesive layer being adhered to each other, so as to connect the first waterproof rubberized layer to the at least two pieces of fabric.

6 Claims, 4 Drawing Sheets

CONNECTING STRUCTURE FOR CONNECTING WATERPROOF BREATHABLE AND WARM KEEPING FABRICS

BACKGROUND

Field of the Invention

The present invention relates to waterproof breathable and warm keeping fabrics, and more particularly to a connecting structure for connecting waterproof breathable and warm keeping fabrics.

Related Prior Art

The existing fishing pants are waterproof and breathable, but are unable to keep warm, so that the wearer will feel cold when wading in the water or sitting for a long time while fishing.

Therefore, some fishing pants which are made of rubber to keep warm are developed. However, rubber fishing pants may keep warm but are not breathable. In order to achieve breathability, the rubber must be perforated with air holes, which, however, will make the fishing pants not waterproof.

The present invention has arisen to mitigate and/or obviate the afore-described disadvantages.

SUMMARY

The present invention is aimed at providing a connecting structure for connecting waterproof breathable and warm keeping fabrics, wherein the waterproof breathable and warm keeping fabrics are connected together to form a pair of fishing pants which is waterproof breathable, and can keep warm.

Hence, a connecting structure for connecting waterproof breathable and warm keeping fabrics provided by the invention, comprises: at least two pieces of fabric, and each of the at least two pieces of fabric sequentially including an inner mesh fabric layer, a breathable and waterproof layer, a breathable layer and an outer fabric layer, wherein the inner mesh fabric layer is located towards user's skin, and the outer fabric layer is located towards outside, the breathable layer includes a plurality of air holes to communicate with the breathable and waterproof layer; a first adhesive layer fixed to a connecting position of each of the at least two pieces of fabric; and a first waterproof rubberized layer fixed to the inner mesh fabric layer of each of the at least two pieces of fabric, and being coated with a second adhesive layer, so that the second adhesive layer and the first adhesive layer being adhered to each other, so as to connect the first waterproof rubberized layer to the at least two pieces of fabric.

Preferably, the connecting structure further comprises a second waterproof rubberized layer which is fixed to the inner mesh fabric layer and the first waterproof rubberized layer of each of the at least two pieces of fabric, and is coated with a third adhesive layer which is located towards the inner mesh fabric layer and the first waterproof rubberized layer, so that the second waterproof rubberized layer is tightly adhered to the inner mesh fabric layer and the first waterproof rubberized layer of each of the at least two pieces of fabric.

Preferably, the breathable and waterproof layer includes a plurality of pores, and a diameter of each of the pores is smaller than a diameter of liquid molecule and larger than a diameter of gas molecule.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there are illustrated preferred embodiments of the invention.

DETAILED DESCRIPTION

Figure 1:
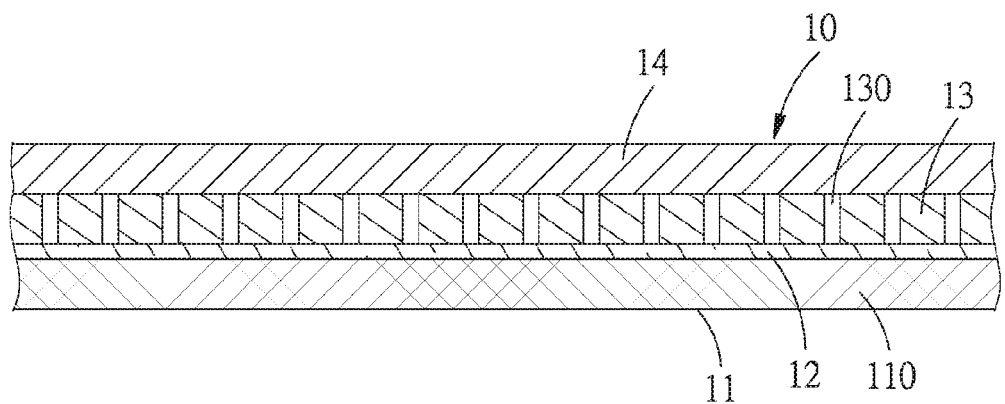
FIG. 1 is a cross sectional view of a waterproof breathable and warm keeping fabric in accordance with a first preferred embodiment of the present invention.
Figure 2:
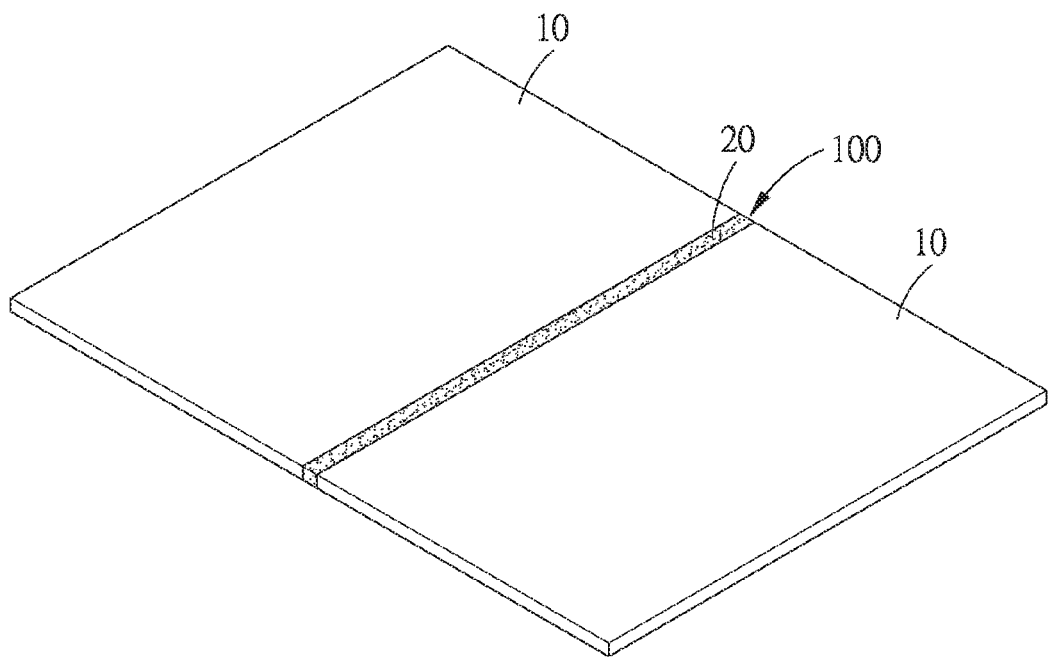
FIG. 2 shows a connecting structure for connecting waterproof breathable and warm keeping fabrics in accordance with the first preferred embodiment of the present invention.
Figure 3:
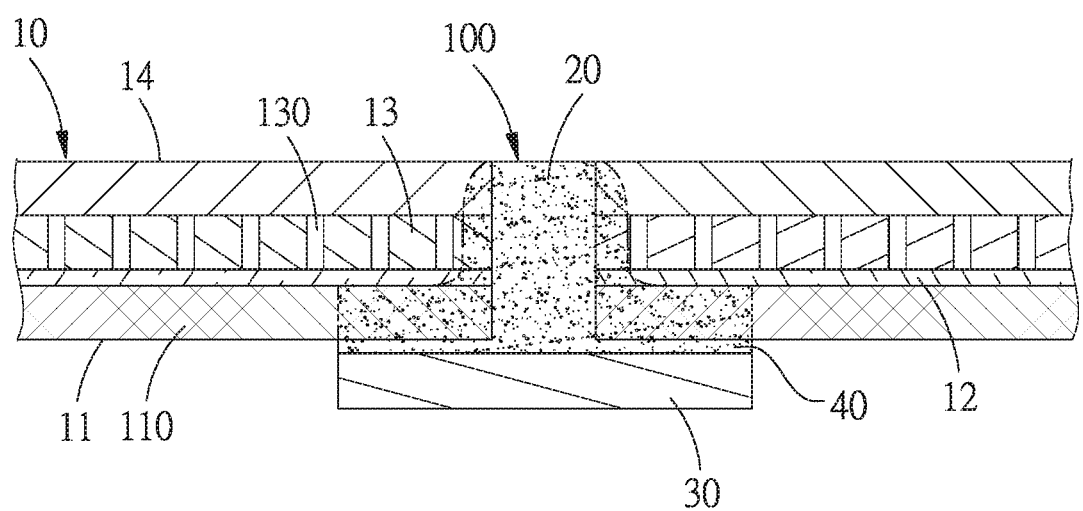
FIG. 3 is another cross sectional view of the waterproof breathable and warm keeping fabric in accordance with the present invention.
Figure 4:
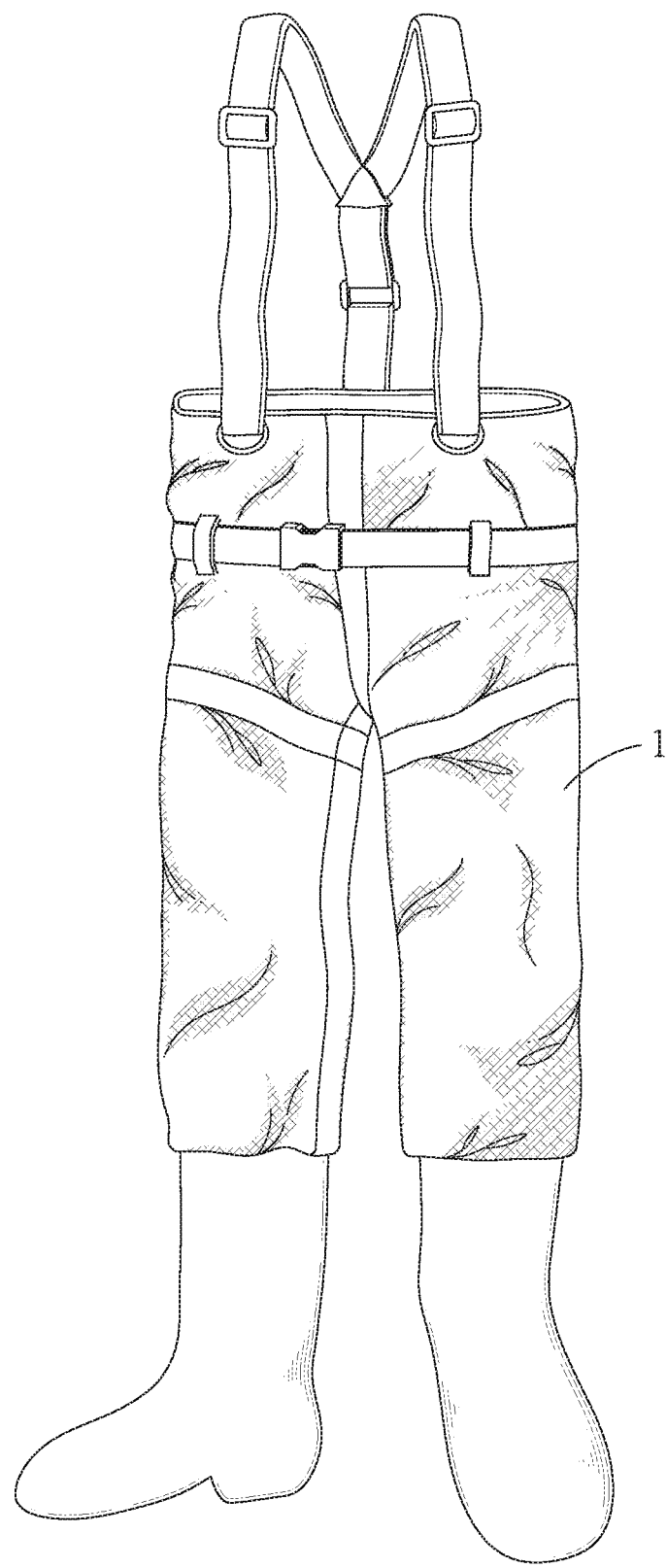
FIG. 4 shows a pair of fishing pants formed by the waterproof breathable and warm keeping fabric in accordance with the present invention.

The present invention will be clearer from the following description when viewed together with the accompanying drawings, which show, for purpose of illustrations only, the preferred embodiment in accordance with the present invention.

Referring to FIGS. 1-4, a connecting structure for connecting waterproof breathable and warm keeping fabrics in accordance with a first preferred embodiment of the present invention comprises: at least two pieces of fabric 10, a first adhesive layer 20, and a first waterproof rubberized layer 30.

Each of the pieces of the fabric 10 sequentially includes an inner mesh fabric layer 11, a breathable and waterproof layer 12, a breathable layer 13 and an outer fabric layer 14.

The inner mesh fabric layer 11 is located towards user's skin, and the outer fabric layer 14 is located towards outside.

The breathable layer 13 includes a plurality of air holes 130 to communicate with the breathable and waterproof layer 12.

The first adhesive layer 20 is fixed to a connecting position 100 of each of the at least two pieces of fabric 10.

The first waterproof rubberized layer 30 is fixed to the inner mesh fabric layer 11 of each of the at least two pieces of fabric 10, and is coated with a second adhesive layer 40 which is located towards the inner mesh fabric layer 11. The first waterproof rubberized layer 30 is heated and pressed by a roller (not shown) at a temperature of 400-600 degrees Celsius and at a pressure of 1-5 kg/cm$^2$, so that the second adhesive layer 40 and the first adhesive layer 20 are adhered to each other, and during the heating and pressing process, the first and second adhesive layers 20, 40 which have been adhered to each other will permeate into the inner mesh fabric layer 11, the breathable and waterproof layer 12, the breathable layer 13 and a part of the outer fabric layer 14, so that the first waterproof rubberized layer 30 is connected to the respective pieces of fabric 10 to form a pair of pants 1, as shown in FIG. 1, and the breathable and waterproof layer 12 and the breathable layer 13 in the fabric 10 make the pants breathable and waterproof.

In this embodiment, the inner mesh fabric layer 11 is provided with a plurality of micro holes 110.

In this embodiment, the breathable and waterproof layer 12 includes a plurality of pores, and the diameter of each of the pores is smaller than a diameter of liquid molecule and larger than a diameter of gas molecule, which makes the breathable and waterproof layer 12 breathable and waterproof.

In this embodiment, the outer fabric layer 14 is made of foamed material (such as rubber).

Figure 5:
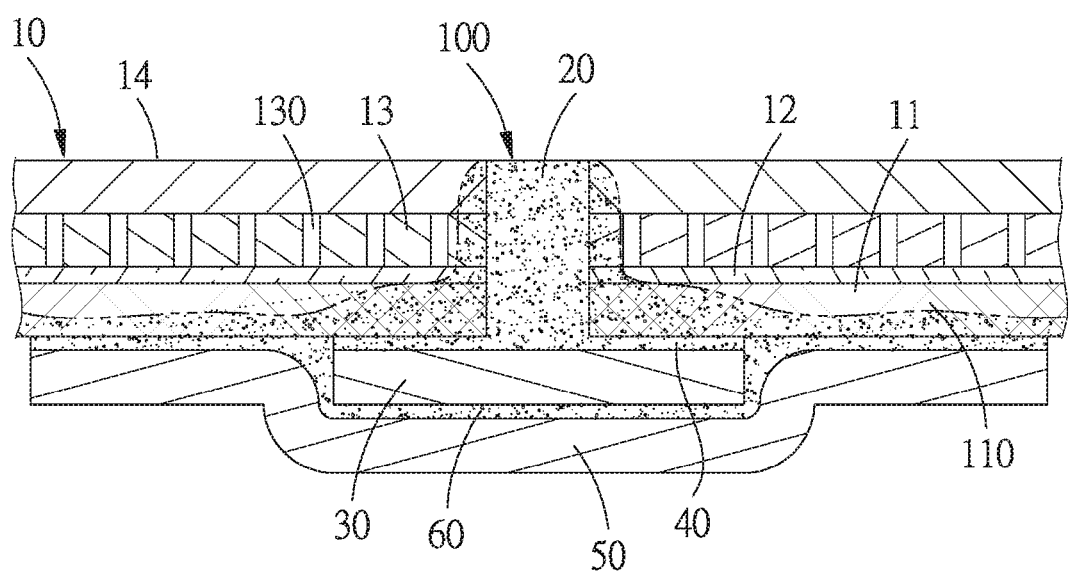
FIG. 5 is a cross sectional view of a waterproof breathable and warm keeping fabric in accordance with a second preferred embodiment of the present invention.

Referring then to FIG. 5, a connecting structure for connecting waterproof breathable and warm keeping fabrics in accordance with a second preferred embodiment of the present invention comprises: at least two pieces of fabric 10, a first adhesive layer 20, a first waterproof rubberized layer 30, a second adhesive layer 40, and a second waterproof rubberized layer 50.

The inner mesh fabric layer 11 is located towards user's skin, and the outer fabric layer 14 is located towards outside.

The breathable layer 13 includes a plurality of air holes 130 to communicate with the breathable and waterproof layer 12.

The first adhesive layer 20 is fixed to a connecting position 100 of each of the at least two pieces of fabric 10.

The first waterproof rubberized layer 30 is fixed to the inner mesh fabric layer 11 of each of the at least two pieces of fabric 10, and is coated with the second adhesive layer 40 which is located towards the inner mesh fabric layer 11. The first waterproof rubberized layer 30 is heated and pressed by a roller (not shown) at a temperature of 400-600 degrees Celsius and at a pressure of 1-5 kg/cm$^2$, so that the second adhesive layer 40 and the first adhesive layer 20 are adhered to each other, and during the heating and pressing process, the first and second adhesive layers 20, 40 which have been adhered to each other will permeate into the inner mesh fabric layer 11, the breathable and waterproof layer 12, the breathable layer 13 and a part of the outer fabric layer 14.

The second waterproof rubberized layer 50 is fixed to the inner mesh fabric layer 11 and the first waterproof rubberized layer 30 of each of the at least two pieces of fabric 10, and is coated with a third adhesive layer 60 which is located towards the inner mesh fabric layer 11 and the first waterproof rubberized layer 30.

The second waterproof rubberized layer 50 is heated and pressed by a roller (not shown) at a temperature of 400-600 degrees Celsius and at a pressure of 1-5 kg/cm$^2$, so that the second waterproof rubberized layer 50 is tightly adhered to the inner mesh fabric layer 11 and the first waterproof rubberized layer 30 of each of the at least two pieces of fabric 10, and the first and second waterproof rubberized layers 30, 50 are connected to the respective pieces of fabric 10 to form a pair of pants 1, as shown in FIG. 1, and the breathable and waterproof layer 12 and the breathable layer 13 in the fabric 10 make the pants breathable and waterproof.

While we have shown and described various embodiments in accordance with the present invention, it is clear to those skilled in the art that further embodiments may be made without departing from the scope of the present invention.

What is claimed is:

1. A connecting structure for connecting waterproof breathable and warm keeping fabrics, comprising:
    at least two pieces of fabric, and each of the at least two pieces of fabric sequentially including an inner mesh fabric layer, a breathable and waterproof layer, a breathable layer and an outer fabric layer, wherein the inner mesh fabric layer is located towards user's skin, and the outer fabric layer is located towards outside, the breathable layer includes a plurality of air holes to communicate with the breathable and waterproof layer;
    a first adhesive layer fixed to a connecting position of each of the at least two pieces of fabric; and
    a first waterproof rubberized layer fixed to the inner mesh fabric layer of each of the at least two pieces of fabric, and being coated with a second adhesive layer, so that the second adhesive layer and the first adhesive layer being adhered to each other, so as to connect the first waterproof rubberized layer to the at least two pieces of fabric.

2. The connecting structure for connecting waterproof breathable and warm keeping fabrics as claimed in claim 1 further comprising a second waterproof rubberized layer which is fixed to the inner mesh fabric layer and the first waterproof rubberized layer of each of the at least two pieces of fabric, and is coated with a third adhesive layer which is located towards the inner mesh fabric layer and the first waterproof rubberized layer, so that the second waterproof rubberized layer is tightly adhered to the inner mesh fabric layer and the first waterproof rubberized layer of each of the at least two pieces of fabric.

3. The connecting structure for connecting waterproof breathable and warm keeping fabrics as claimed in claim 1, wherein the outer fabric layer is made of foamed material.

4. The connecting structure for connecting waterproof breathable and warm keeping fabrics as claimed in claim 3, wherein the foamed material is rubber.

5. The connecting structure for connecting waterproof breathable and warm keeping fabrics as claimed in claim 1, wherein the breathable and waterproof layer includes a plurality of pores, and a diameter of each of the pores is smaller than a diameter of liquid molecule and larger than a diameter of gas molecule.

6. The connecting structure for connecting waterproof breathable and warm keeping fabrics as claimed in claim 1, wherein the inner mesh fabric layer is provided with a plurality of micro holes.

* * * * *